US010194122B2

(12) United States Patent
Tang

(10) Patent No.: US 10,194,122 B2
(45) Date of Patent: Jan. 29, 2019

(54) METHOD FOR CONTROLLING PROJECTOR AND PROJECTOR APPLICABLE TO SAME

(71) Applicant: YUTOU TECHNOLOGY (HANGZHOU) CO., LTD., Hangzhou, Zhejiang (CN)

(72) Inventor: Jinteng Tang, Zhejiang (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 15/740,244

(22) PCT Filed: Jun. 21, 2016

(86) PCT No.: PCT/CN2016/086623
§ 371 (c)(1),
(2) Date: Dec. 27, 2017

(87) PCT Pub. No.: WO2017/000812
PCT Pub. Date: Jan. 5, 2017

(65) Prior Publication Data
US 2018/0192012 A1 Jul. 5, 2018

(30) Foreign Application Priority Data

Jun. 30, 2015 (CN) .......................... 2015 1 0387028

(51) Int. Cl.
*H04N 5/64* (2006.01)
*H04N 9/31* (2006.01)
(Continued)

(52) U.S. Cl.
CPC .............. *H04N 9/31* (2013.01); *G03B 21/14* (2013.01); *H04N 9/73* (2013.01)

(58) Field of Classification Search
CPC .......... H04N 9/31; H04N 9/73; H04N 9/3182; H04N 9/3194; H04N 9/3197; G03B 21/14; G03B 21/20; G03B 33/06
(Continued)

(56) References Cited

U.S. PATENT DOCUMENTS 7,110,002 B2 * 9/2006 Wada ..................... H04N 1/603
345/600
7,532,239 B2 * 5/2009 Hayaishi .............. H04N 1/2158
348/223.1
9,134,597 B2 * 9/2015 Mizuno ................ G03B 21/206

FOREIGN PATENT DOCUMENTS

CN 1383541 A 12/2002
CN 1692656 A 11/2005
(Continued)

OTHER PUBLICATIONS

State Intellectual Property Office of the P.R. China, International Search Report for International application No. PCT/CN2016/086623, dated Sep. 14, 2016, 3 total pages.

*Primary Examiner* — Trang U Tran
(74) *Attorney, Agent, or Firm* — Socal IP Law Group LLP; Nikki M. Dossman

(57) ABSTRACT

The present invention provides a method for controlling a projector and a projector applicable to the method. The method for controlling a projector comprises steps: enabling a projector, and projecting on a screen; enabling a sensing module, and obtaining an output image or a current environment image; processing the output image or the current environment image to obtain an RGB component, and calculating the gain coefficients of three channels RGB according to an automatic white balance algorithm; and adjusting the gains of the three channels RGB in the projector according to the gain coefficients. Using the method and the projector enables a projection screen not to be (Continued)

limited by colors, that is, screens with various colors can be chosen at ease, and the imaging effect of projection is not influenced.

6 Claims, 4 Drawing Sheets

(51) Int. Cl.
*H04N 9/73* (2006.01)
*G03B 21/14* (2006.01)

(58) Field of Classification Search
USPC .................................................. 348/743–747
See application file for complete search history.

(56) References Cited

FOREIGN PATENT DOCUMENTS

| | | |
|---|---|---|
| CN | 103543582 A | 1/2014 |
| CN | 103777438 A | 5/2014 |
| JP | H0453374 A | 2/1992 |
| JP | 2006140839 A | 6/2006 |
| WO | 2017/000812 | 1/2017 |

\* cited by examiner

METHOD FOR CONTROLLING PROJECTOR AND PROJECTOR APPLICABLE TO SAME

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/CN2016/086623, filed Jun. 21, 2016 entitled, "METHOD FOR CONTROLLING PROJECTOR AND PROJECTOR APPLICABLE TO SAME", which claims priority to Chinese Patent Application No. CN 201510387028.X, filed on Jun. 30, 2015, the entire content of which is incorporated herein by reference.

BACKGROUND

Field of the Invention

The present invention relates to the technical field of projector devices, and in particular, to a method for controlling a projector and a projector applicable to the method.

Description of the Related Art

So far, the projectors are mainly realized by three kinds of display technologies, that is, the CRT projection technology, the LCD projection technology and the DLP projection technology developed in recent years.

CRT is an English abbreviation of Cathode Ray Tube, translated as cathode ray tube. As an imaging device, it is the earliest and most widely used display technology. This projector can be decomposed into the input signal source R (red), G (green) B (blue) three CRT tube screen, and the phosphor lights under the action of high pressure, systematically magnified, convergent, showing a color image on the big screen. The optical system and CRT tube form a projection tube. The so-called three gun projector is composed of a projector comprising three projection tubes, due to the use of light source, also known as active projection. CRT technology is mature, so the images displayed are rich in color, good in reducibility with the ability for adjusting geometric distortion. However, the important technical indicators image resolution and brightness are mutually restricted, which directly affect the brightness value of a CRT projector. Up to now, the brightness value is always hovering below 300 Lm. In addition, the operation of the CRT projector is complicated. In particular, the convergence adjustment is tedious, the body is bulky, and is only suitable for installation in places where the ambient light is weak and relatively fixed, and should not be moved.

LCD is an English abbreviation of Liquid Crystal Device. LCD projector is divided into two kinds as liquid crystal board and liquid crystal light valve. Liquid crystal is a substance between liquid and solid. It does not shine, and the working nature is greatly influenced by temperature, and its working temperature is −55 C~+77 C. The projector utilizes the photoelectric effect of the liquid crystal, that is, the arrangement of the liquid crystal molecules changes under the influence of the electric field, affecting the light transmittance or reflectivity of the liquid crystal cell, thereby affecting its optical nature, resulting in images with different gray levels and colors.

DLP is an English abbreviation of Digital Light Processor, translated as digital light processor. The birth of this new projection technology enabled us to finally realize digital information display with the ability to capture, receive and store digital information. DLP technology is an epoch-making revolution in the field of display. Just as CDs have a huge impact on audio, DLP will open a new chapter in video projection display. The key technical points of its DLP projector with DMD (Digital Micromirror Device) digital microreflector as a light valve imaging device are as follows: the first is the digital advantage. The use of digital technology has achieved the image grayscale of 256-1024 level, the color of 2563-10243 kinds, the disappearance of the image noise, the stability of the picture quality, wherein accurate digital images can be reproduced continuously, and lasting. The second is the reflection advantage. The application of the reflective DMD device makes the total optical efficiency of the imaging device more than 60%, and the uniformity of contrast and brightness is excellent. On the DMD block, the area of each pixel is 16 μm*16 μm, and the interval is 1 μm. According to the number of DMD used, the DLP projector can be divided into single chip, two chips and three chips machine. DLP projector has high definition, uniform picture, sharp color, and three chips machine can be more than 1000 lm in brightness. It abandoned the traditional sense of convergence, which can be free to zoom, and the adjustment is very convenient; however, the resolution is not high, with uncompressed resolution of 800×600 (some models of the latest product resolution has reached 1280×1024). However, due to the new technology, the difficulty and cost of maintenance are not low.

Basically all types of projectors have the same principle for displaying images. The projector first shines light onto the image display element to produce an image, which is then projected through the lens. The image display element of the projector includes a transmission type that generates an image by light transmission and a reflection type that generates an image by using the reflection light. No matter what kind of type, it is necessary to divide the light of the projection lamp into red, green and blue colors to produce various color images. Because the element itself can only be monochrome display, it is necessary to use three-color elements to generate three-color parts. And then the three-color images are combined into one image through the prism, and finally projected onto the screen through the lens.

In the case of DLP projectors, projectors need to project their images onto a white screen to maximize the projected image quality. When the screen is not white, such as the screen is yellow, red, green, or the surrounding environment is yellow, red and other interference, the projected image quality is affected by screen color or ambient light color, resulting in image distortion.

The reason for the image distortion is that the projector does not have the function of automatic white balance based on screen color or ambient light color. Projector just projected the original image as realistic as possible. There is no adaptive self-adjusting capability for different color screens or different color ambient light.

SUMMARY OF THE INVENTION

In view of the above technical problem, the present application provides a method for controlling a projector, comprising the steps of:

S1: enabling a projector, and projecting on a screen;

S2: enabling a sensing module, and obtaining an output image or a current environment image;

S3: processing the output image or the current environment image to obtain an RGB component, and calculating the gain coefficients of three channels RGB according to an automatic white balance algorithm;

S4: and adjusting the gains of the three channels RGB in the projector according to the gain coefficients.

Preferably, the step S3 comprises the steps of:

S31: obtaining an RGB component of the output image or the current environment image;

S32: counting each average value of the RGB components, as Rave, Gave, Bave;

S33: calculating a grayscale value Gary of the output image or the current environment image;

S34: calculating the gain coefficients Kr, Kg, Kb of channel R, channel G, channel B according to each average value of the grayscale value Gary and the RGB component;

S35: and adjusting the R, G, B gains of each pixel in the projected image according to the gain coefficient Kr, the gain coefficient Kg, the gain coefficient Kb.

Preferably, in the step S33, the grayscale value Gary is calculated as Gray=(Rave+Gave+Bave)/3.

Preferably, in the step S34, the gain coefficients Kr, Kg and Kb are calculated as kr=Gray/Rave; kg=Gray/Gave; kb=Gray/Bave.

The present invention also provides a projector, which is applicable to the method for controlling the projector, comprising a projector body for projecting on a screen, wherein, further comprising a sensing module located on the projector body for obtaining the output image or the current environment image; and a control device configured to process the output image or the current environment image, so as to obtain the gain coefficients of three channels RGB in the projector after calculation and adjust the gains of the three channels RGB according to the gain coefficients.

Preferably, the control device comprises: a reading unit configured to obtain the RGB component of the output image or the current environment image; a counting unit for counting each average value of the RGB components, as Rave, Gave, Bave; a calculating unit for calculating the grayscale value Gary of the output image or the current environment image; a coefficient obtaining unit for calculating the gain coefficients Kr, Kg, Kb of the three channels R, G, B according to each average value of the grayscale value Gary and the RGB component; an adjusting unit for adjusting the R, G, B gains of each pixel in the projection image according to the gain coefficients Kr, Kg, Kb of the three channels.

Preferably, the sensing module is an RGB light sensor.

Preferably, the sensing module is an RGB light sensing matrix.

Preferably, the sensing module is a camera.

Preferably, the direction of the sensing module is the same as the projection direction of the projector body.

In summary, due to the adoption of the above technical solutions, the present patent application describes a method for controlling a projector and a projector applicable to the method. The gain effect is as follows: if the sensing module collects the output image, the projector can make the projection screen no longer limited by the color. That is, with the projector, the screen of various colors can be freely selected and the influence of the projection will not be affected; if the sensing module collects the current environment image, the present invention can also remove the influence of the color temperature of ambient light on the projection effect.

DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
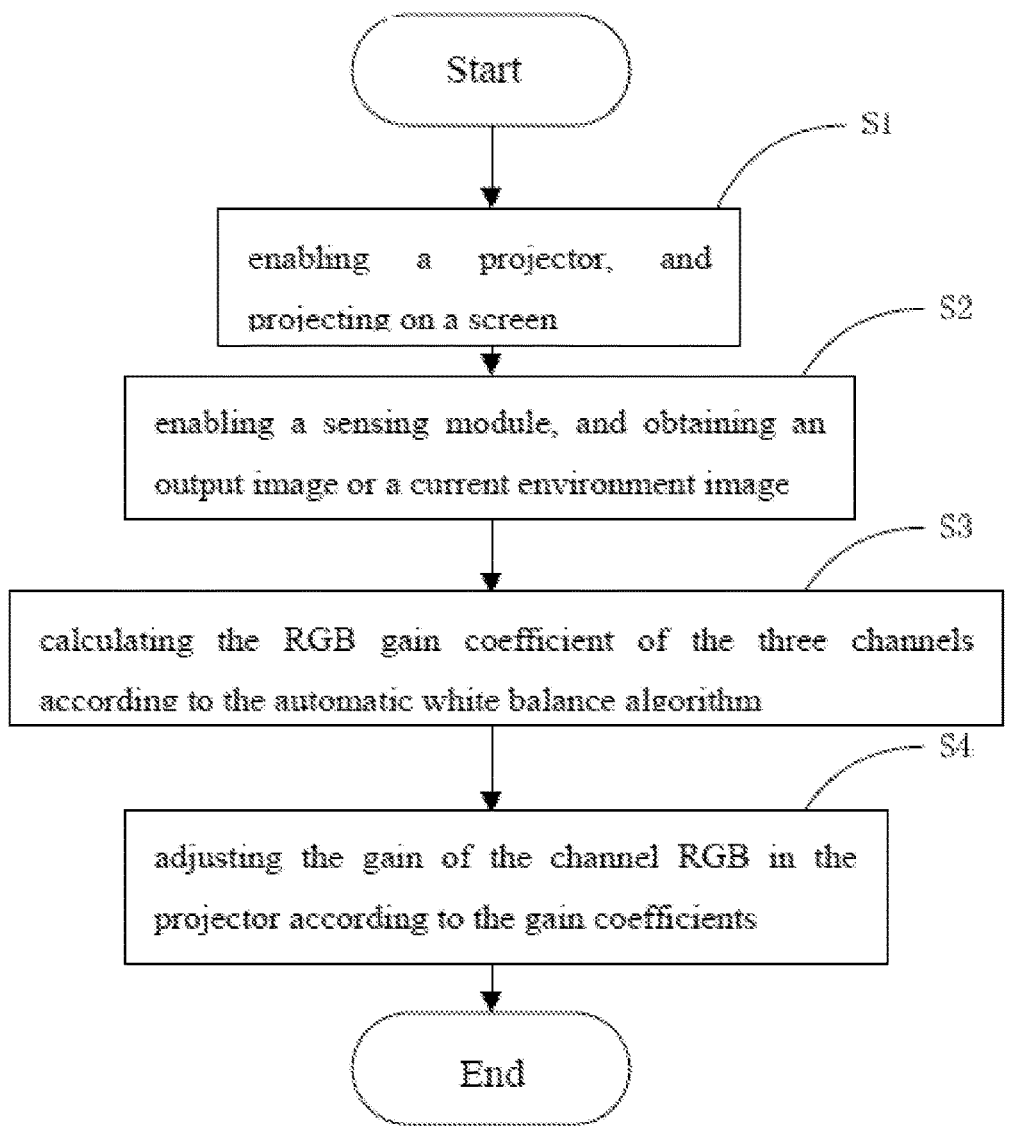
FIG. 1 is a flowchart 1 of a method for controlling a projector of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

EXAMPLE 1

As shown in FIG. 1, a method for controlling a projector, comprising the steps of:

S1: enabling a projector, and projecting on a screen;

S2: enabling a sensing module 2, and obtaining an output image or a current environment image;

S3: calculating the gain coefficients of three channels RGB according to an automatic white balance algorithm;

S4: and adjusting the gains of the channel RGB in the projector according to the gain coefficients.

Figure 2:
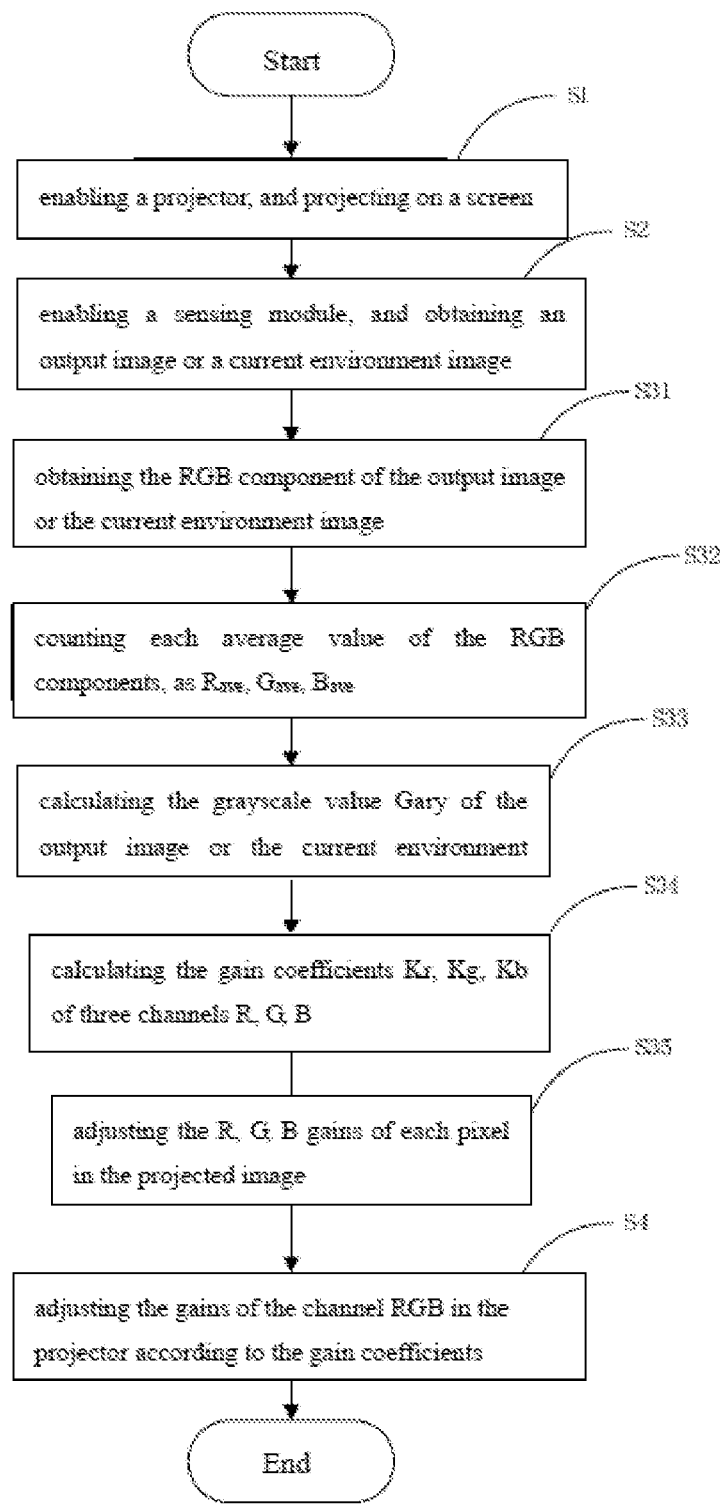
FIG. 2 is a flowchart 2 of a method for controlling a projector of the present invention.
Figure 3:
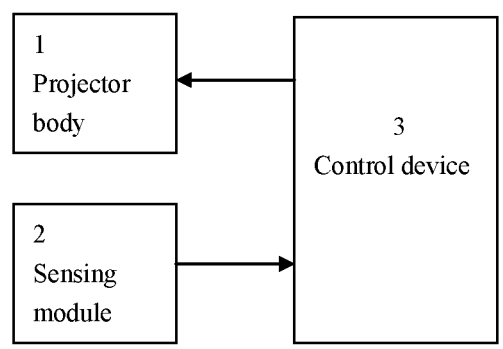
FIG. 3 is a structural view 1 of a projector of the present invention.
Figure 4:
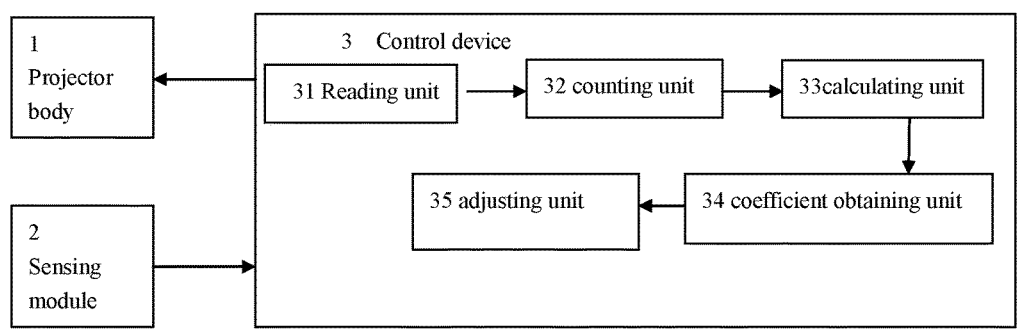
FIG. 4 is a structural view 2 of a projector of the present invention.

As shown in FIG. 2, wherein, the step S3 comprises the steps of:

S31: obtaining an RGB component of the output image or the current environment image;

S32: counting each average value of the RGB components, as Rave, Gave, Bave;

S33: calculating a grayscale value Gary of the output image or the current environment image, wherein, Gray=(Rave+Gave+Bave)/3;

S34: calculating the gain coefficients Kr, Kg, Kb of channel R, channel G, channel B, wherein, kr=Gray/Rave, kg=Gray/Gave, kb=Gray/Bave;

S35: and adjusting the R, G, B gains of each pixel in the projected image according to the gain coefficients Kr, Kg, Kb.

In operation, it shall start the projector first to project it on the screen. Then, the sensing module 2 is operated to obtain an output image or a current environment image. The output image or the current environment image is processed to obtain RGB components thereof, so as to calculate each average value Rave, Gave and Bave of the RGB components. Assuming that any one of the images has a sufficient color change, the mean value of its RGB components tends to be the same gray value Gray, so the gray value of the output image or the current environment is calculated as Gary=(Rave+Gave+Bave)/3. The gain coefficients Kr, Kg, Kb of the three channels R, G, B are calculated. Finally, the R, G and B gains of each pixel in the projection image are adjusted according to the three gain coefficients to realize the automatic white balance of the projector. According to the method for controlling a projector, if the output image is captured in step S2, the method enables the projection screen no longer limited by the color, that is, the method can freely select the screens of various colors and the influence of the projection will not be affected. If the current environment image is captured in step S2, the present invention can also remove the influence of the color temperature of the ambient light on the projection effect.

EXAMPLE 2

According to the above embodiment, a method for controlling a projector is provided, and this embodiment provides a projector applicable to the method.

The projector comprising: a projector body 1 for projecting a image on a screen; a sensing module 2 located on the projector body 1 for obtaining the output image or the current environment image; a control device 3 configured to process the output image or the current environment image, so as to obtain the gain coefficients of three channels RGB in the projector after calculation and adjust the gains of the three channels RGB according to the gain coefficients.

Wherein, the control module 3 comprising: a reading unit 31 for obtaining the RGB component of the output image or the current environment image; a counting unit 32 for counting each average value of the RGB components, as Rave, Gave, Bave; a calculating unit 33 for calculating the grayscale value Gary of the output image or the current environment image; a coefficient obtaining unit 34 for calculating the gain coefficients Kr, Kg, Kb of the three channels R, G, B according to each average value of the grayscale value Gary and the RGB component; an adjusting unit 35 for adjusting the R, G, B gains of each pixel in the projection image according to the gain coefficients Kr, Kg, Kb of the three channels.

Wherein, the calculating unit 33 calculates the grayscale value Gary as follows: Gary=(Rave+Gave+Bave)/3. The coefficient obtaining unit 34 calculates the gain coefficients Kr, Kg, Kb of the three channels R, G, B as follows: kr=Gray/Rave, kg=Gray/Gave, kb=Gray/Bave.

The sensing module 2 is three RGB light sensors, which are simple, inexpensive, but less accurate. The sensing module 2 may also be an RGB light sensing matrix, or may be a camera. The accuracy of the latter two is higher than the former, the final gain effect will be better, but the cost is higher than the former. According to different applications, the location of the sensing module 2 should also be different. When it is needed to achieve automatic white balance on the screen color, the sensing module 2 needs to obtain the output image, then the sensing module 2 needs to directly face the projection direction of the projector body 1; when it is needed to achieve automatic white balance on the ambient light, the sensing module 2 needs to obtain the current environment image, then the location and orientation of the sensing module 2 do not need to be strictly set.

In operation, the projector body 1 projects onto the screen, and the sensing module 2 collects the output image or the current environment image. The reading unit 31 reads the RGB component of the captured image and transmits it to the counting unit 32, after which the counting unit 32 counts the average values Rave, Gave, Bave of the RGB components. The calculating unit 33 obtains the grayscale value Gary of the image collected by the sensing module 2 according to the three average values and transmits the average values Rave, Gave and Bave of the RGB components and the grayscale value Gary of the image to the coefficient acquiring unit 34, so as to calculate the gain coefficients Kr, Kg, and Kb of the three channels R, G, and B. Finally, the adjusting unit 35 adjusts the R, G, B gains of each pixel in the projection image according to Kr, Kg, Kb. By adjusting the R, G, B gains of the pixels in the projected image, If the sensing module 2 collects the output image, the projector can make the projection screen no longer limited by the color. That is, with the projector, the screen of various colors can be freely selected and the influence of the projection will not be affected; if the sensing module 2 collects the current environment image, the present invention can also remove the influence of the color temperature of ambient light on the projection effect. With the projector, the projection screen is no longer limited by the color. That is, the projector can freely select screens of various colors and the influence of the projection is not affected. In addition, the projector can also remove the influence of the color temperature of ambient light on the projection effect and greatly improve the projection effect.

The foregoing is only a preferred embodiment of the present invention and is not intended to limit the description and the scope of protection of the invention, and it will be appreciated by those skilled in the art that equivalent replacement using the specification and drawings of the present invention, and solution with apparent changes to specification and drawings of the present invention are to be included within the scope of the present invention.

It is claimed:

1. A method for controlling a projector, wherein, comprising steps as follows:

S1: enabling a projector, and projecting on a screen;

S2: enabling a sensing module, and obtaining an output image or a current environment image;

S3: processing the output image or the current environment image to obtain an RGB component, and calculating the gain coefficients of three channels RGB according to an automatic white balance algorithm;

S4: and adjusting the gains of the three channels RGB in the projector according to the gain coefficients;

the step S3 comprising:

S31: obtaining an RGB component of the output image or the current environment image;

S32: counting each average value of the RGB components, as Rave, Gave, Bave;

S33: calculating a grayscale value Gary of the output image or the current environment image;

S34: calculating the gain coefficient Kr of channel R, the gain coefficient Kg of channel G, and the gain coefficient Kb of channel B according to each average value of the grayscale value Gary and the RGB component; the grayscale value Gary is calculated as Gray=(Rave+Gave+Bave)/3;

S35: and adjusting the R, G, B gains of each pixel in the projected image according to the gain coefficient Kr, the gain coefficient Kg, the gain coefficient Kb; the gain coefficients Kr, Kg, Kb are calculated as Kr=Gray/Rave; Kg=Gray/Gave; Kb=Gray/Bave;

if the output image is captured in step S2, the method freely selects the screens of various colors and the influence of the projection will not be affected, if the current environment image is captured in step S2, the influence of the color temperature of the ambient light on the projection effect is removed.

2. A projector, including a projector body configured to project a projection on a screen, comprising a sensing module located on the projector body for obtaining an output image or a current environment image; and a control device connected with the sensing module and configured to process the output image or the current environment image, so as to obtain the gain coefficients of three channels RGB in the projector after calculation and adjust the gains of the three channels RGB according to the gain coefficients;

the control device comprising:

a reading unit for obtaining the RGB component of the output image or the current environment image;

a counting unit, connected with the reading unit, for counting each average value of the RGB components, as Rave, Gave, Bave;

a calculating unit, connected with the counting unit, for calculating the grayscale value Gary of the output image or the current environment image;

a coefficient obtaining unit, connected with the calculating unit, for calculating the gain coefficients Kr, Kg, Kb of the three channels R, G, B according to each average value of the grayscale value Gary and the RGB component; and an adjusting unit, connected with the coefficient obtaining unit, for adjusting the R, G, B gains of each pixel in the projection image according to the gain coefficients Kr, Kg, Kb of the three channels.

3. The projector of claim 2, wherein, the sensing module is an RGB light sensor.

4. The projector of claim 2, wherein, the sensing module is an RGB light sensing matrix.

5. The projector of claim 2, wherein, the sensing module is a camera.

6. The projector of claim 5, wherein, the direction of the sensing module is the same as the projection direction of the projector body.

* * * * *